United States Patent [19]

Miller

[11] Patent Number: 5,247,982
[45] Date of Patent: Sep. 28, 1993

[54] TUBELESS TIRE BEAD SEATER

[76] Inventor: Dale A. Miller, 3842 Klondike, Louisville, Ky. 40218

[21] Appl. No.: 998,952

[22] Filed: Dec. 31, 1992

[51] Int. Cl.⁵ .......................................... B60C 25/06
[52] U.S. Cl. ................................................ 157/1.1
[58] Field of Search .................................. 157/1, 1.1

[56] References Cited

U.S. PATENT DOCUMENTS

| | | |
|---|---|---|
| 2,913,035 | 11/1959 | Lapin . |
| 3,552,469 | 1/1971 | Corless . |
| 3,675,705 | 7/1972 | Corless . |
| 3,677,320 | 7/1972 | Corless . |
| 3,683,991 | 8/1972 | Ruhland et al. . |
| 3,785,424 | 1/1974 | Rishovd . |
| 3,789,901 | 2/1974 | Rishovd . |
| 3,805,871 | 4/1974 | Corless . |
| 3,814,163 | 6/1974 | Charles et al. . |
| 4,263,958 | 4/1981 | Corless . |
| 4,744,402 | 5/1988 | St. Hilaire . |

*Primary Examiner*—D. S. Meislin
*Attorney, Agent, or Firm*—Woodard, Emhardt, Naughton, Moriarty & McNett

[57] ABSTRACT

A pneumatic device for seating the beads of a tubeless tire onto the bead area of a tubeless wheel or rim, comprising a pneumatic pipe having a first end portion and a second end portion and shaped in the form of an arc from the first end portion to the second end portion; a first handle attached to the first end portion of the pipe for providing a stabilizing hand grip at the first end portion of the pipe; a pneumatic valve attached to the second end portion of the pipe for selectively communicating the pipe with a source of compressed air, and including a second handle for providing a stabilizing hand grip at the second end portion of the pipe; and pneumatic openings in the arc-shaped portion of the pipe communicating with the valve and positioned to direct compressed air into the gap between an unseated tubeless tire bead and the bead area of the wheel or rim upon which the bead is to be seated.

8 Claims, 4 Drawing Sheets

TUBELESS TIRE BEAD SEATER

BACKGROUND OF THE INVENTION

The present invention relates to pneumatic tools for seating the beads of tubeless tires onto tubeless wheels and rims.

To inflate a tubeless tire to a desired operating air pressure, it is first necessary to seat, or seal, the beads of the tire onto the bead area of the wheel or rim. Seating the tire beads to the bead area of the wheel or rim creates a pressurizable chamber within the tire that may then be charged with air through a conventional valve stem mounted through the wheel or rim. The well-known problem faced by operators when mounting large tubeless tires, such as 24.5×8.25 truck tires for example, is that it is relatively difficult to seat both of the tire beads simultaneously due to the weight and stiffness of the side walls of the tires.

In recent years, mechanical means for seating the beads of large tubeless tires, such as circular bands around the tire tread that squeeze the tire about its circumference to expand the tire's side walls outwardly until the tire's beads are both in contact with the bead area of the wheel or rim, have given way to high pressure pneumatic tools. Pneumatic tools instantaneously inject a large volume of highly pressurized air into the gap between the wheel or rim and an unseated tire bead, while pressurized air is simultaneously being injected into the tire through the conventional valve stem. At the moment the pneumatic tool is activated, there is instantaneously a larger volume of air entering the tire than is escaping around the unseated tire beads, and the tire's side walls rapidly expand. The tire beads then come into seating contact with the bead area of the wheel or rim. The tire and wheel or rim then instantaneously become a pressurizable chamber that is further pressurized by the air entering the chamber through the conventional valve stem.

Numerous pneumatic tools for seating tubeless tire beads in the general manner described above are known in the prior art. Most are of a relatively complex design and/or have cumbersome adjustment mechanisms by which they must be adjusted for use with tubeless tires and wheels or rims of varying diameters. Most are also designed to inject air symmetrically about the wheel or rim, either through a continuous ring around the wheel or rim or through a discontinuous ring comprising two or more arc-shaped plenum symmetrically positioned about the wheel or rim. For example, U.S. Pat. No. 3,683,991 to Ruhland et al. discloses a pneumatic bead seating device that has a C-shaped configuration that places two arcuate housings in mirror image relationship around a wheel or rim. The fixed positioning of the C-shaped configuration of the embodiment of the Ruhland et al. invention illustrated in FIGS. 6-10 makes it difficult to use the illustrated device with smaller diameter wheels or rims. As illustrated in FIG. 10 of Ruhland et al., it is suggested that the Ruhland et al. device be physically raised by the operator above a smaller wheel or rim and held in place by the operator without any direct stabilizing contact with the wheel or rim while jets of highly compressed air are directed downwardly from the elevated device toward the gap between the smaller wheel or rim and tire bead below.

SUMMARY OF THE INVENTION

The tubeless tire bead seater of the present invention is a pneumatic tool of a more simple and compact design than the pneumatic tire bead seaters of the prior art, yet the tool of the present invention works extremely well for its intended purpose and accommodates a wide range of tubeless tire and tubeless wheel and rim sizes without mechanical adjustment. The more simple and compact design of the tool of the present invention also means that it is both easier to use and easier to transport than are the pneumatic tire bead seaters of the prior art.

One embodiment of the present invention is a pneumatic device for seating the beads of a tubeless tire onto the bead area of a tubeless wheel or rim, comprising a pneumatic pipe having a first end portion and a second end portion and shaped in the form of an arc from the first end portion to the second end portion; first handle means attached to the first end portion of the pipe for providing a stabilizing hand grip at the first end portion of the pipe; pneumatic valve means attached to the second end portion of the pipe for selectively communicating the pipe with a source of compressed air, and including second handle means for providing a stabilizing hand grip at the second end portion of the pipe; and pneumatic openings in the arc-shaped portion of the pipe communicating with the valve means and positioned to direct compressed air into the gap between an unseated tubeless tire bead and the bead area of the wheel or rim upon which the bead is to be seated.

Another embodiment of the present invention is a pneumatic tool for seating the beads of a tubeless tire onto the bead area of a tubeless wheel or rim, comprising a pneumatic pipe having a first end portion and a second end portion and shaped in the form of an arc from the first end portion to the second end portion; first handle means attached to the first end portion of the pipe for providing a stabilizing hand grip at the first end portion of the pipe; pneumatic valve means attached to the second end portion of the pipe for selectively communicating the pipe with a source of compressed air, and including a full port ball valve with second handle means for providing a stabilizing hand grip at the second end portion of the pipe; and pneumatic openings spaced along the arc-shaped portion of the pipe and communicating with the valve means and positioned to direct compressed air into the gap between an unseated tubeless tire bead and the bead area of the wheel or rim upon which the tire bead is to be seated.

Another embodiment of the present invention is a pneumatic tool for seating the beads of a tubeless tire onto the bead area of a tubeless wheel or rim, comprising a pneumatic pipe having a first end portion and a second end portion and shaped in the form of a planar arc from the first end portion to, but not including, the second end portion; first handle means attached to the first end portion of the pipe for providing a stabilizing hand grip at the first end portion of the pipe; pneumatic valve means attached to the second end portion of the pipe for selectively communicating the pipe with a source of compressed air, and including a full port ball valve with second handle means for providing a stabilizing hand grip at the second end portion of the pipe, the second handle means including an on/off lever by which the full port ball valve is manually operated: and a plurality of pneumatic holes spaced along the arc-shaped portion of the pipe that communicate with the valve means and that are positioned to direct compressed air into the gap between an unseated tubeless tire bead and the bead area of the wheel or rim upon which the tire bead is to be seated when the valve means communicates compressed air to the pneumatic holes.

It is an object of the present invention to provide a tubeless tire bead seater of a more simple and compact design than the pneumatic tire bead seaters of the prior art, and that accommodates a wide range of wheels and rims and tubeless tire sizes without mechanical adjustments.

Related objects and advantages of the tubeless tire bead seater of the present invention will be evident from the following description of the preferred embodiment to date.

DESCRIPTION OF THE PREFERRED EMBODIMENT

Figure 1:
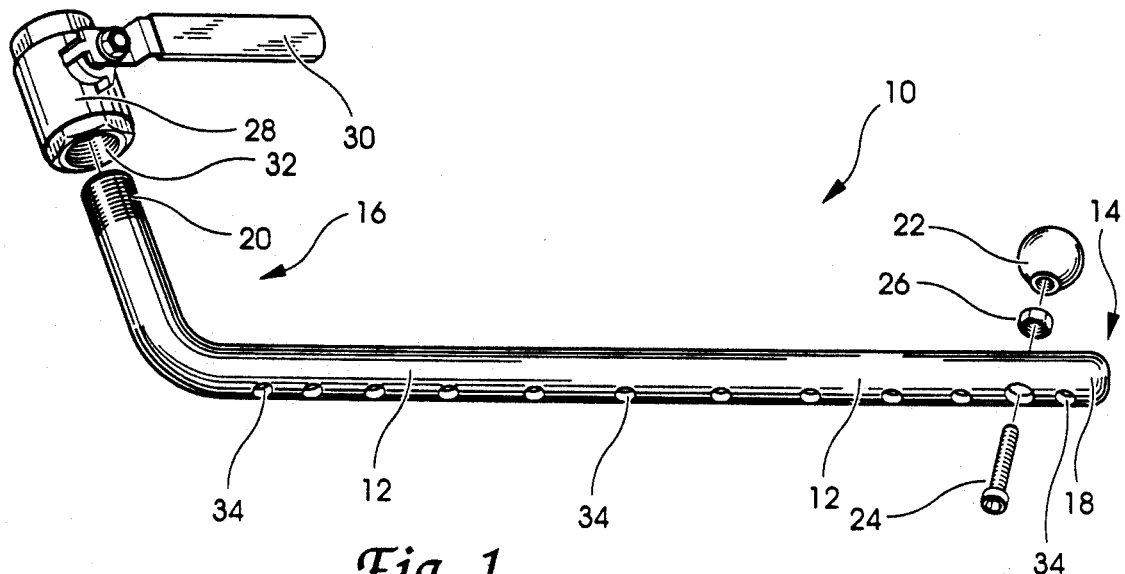
FIG. 1 is an exploded front view of a preferred embodiment of the tubeless tire bead seater of the present invention.

For the purposes of promoting an understanding of the principles of the invention, reference will now be made to the preferred embodiment illustrated in the drawings, and specific language will be used to describe the same. It should nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, the preferred embodiment of the tubeless tire bead seater 10 of the present invention has a more simple and compact design than any of the known pneumatic tubeless tire bead seaters of the prior art. Referring to FIG. 1, the preferred embodiment of the present invention consists of a 1 and ¼ inch (O.D.)×1 inch (I.D.) pipe 12 that has a first end portion 14 and a second end portion 16. Pipe 12 has been provided with an air-tight end cap 18 at its first end portion 14 by conventional means. The second end portion 16 of pipe 12 is not capped, but is provided with conventional threads 20 about its outer diameter (FIG. 1).

Figure 3:
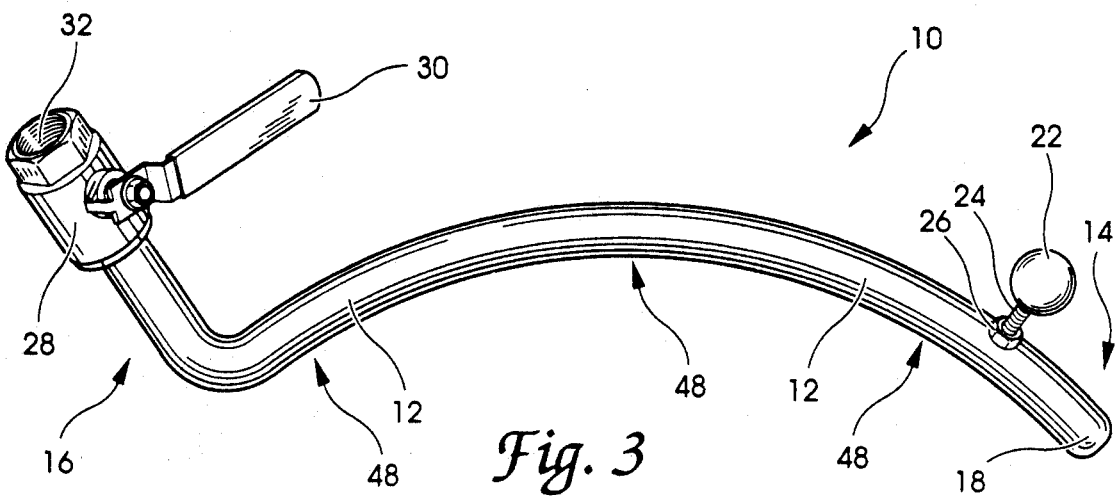
FIG. 3 is a top view of the tubeless tire bead seater of FIG. 1.
Figure 4:
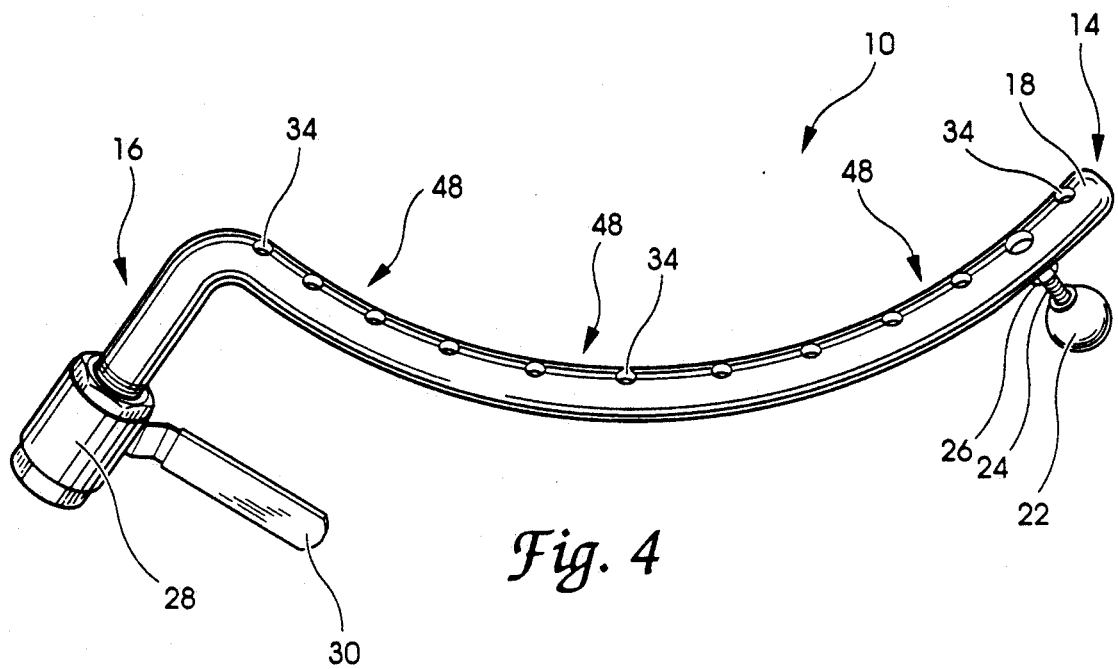
FIG. 4 is a bottom view of the tubeless tire bead seater of FIG. 1.
Figure 5:
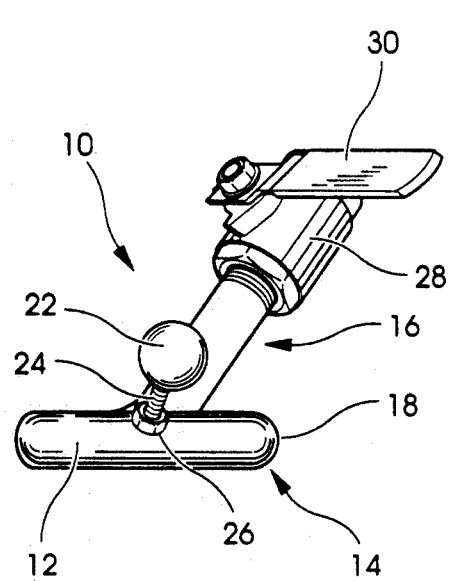
FIG. 5 is a right side view of the tubeless tire bead seater of FIG. 1.
Figure 6:
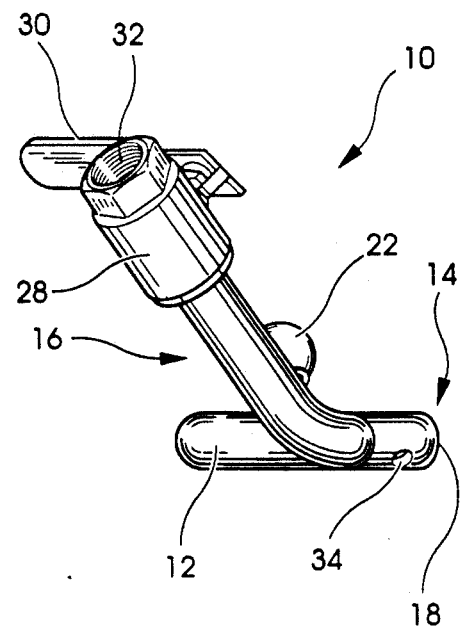
FIG. 6 is a left side view of the tubeless tire bead seater of FIG. 1.

As is clearly illustrated in the drawings (FIGS. 3 and 4), pipe 12 has been bent into a planar arc-shape from its first end portion 14 to, but not including, its second end portion 16. In the preferred embodiment illustrated in the drawings, the arc imparted to pipe 12 was chosen to match the arc of the outermost portion of a standard 24.5 inch wheel primarily because the 24.5 inch sized tubeless tires and corresponding wheels and rims are common for larger vehicles, such as trucks. However, it should be understood that the arc imparted to pipe 12 could be chosen to match the arc of the outermost portion of any size wheel or rim.

As is equally clear from the drawings (FIGS. 3, 4, 5 and 6), the second end portion 16 of pipe 12 has been bent by conventional means so that a centerline drawn through the second end portion 16 of pipe 12 would intersect a centerline drawn through the arced portion of pipe 12 at an angle of about 90 degrees, and would intersect the plane in which the centerline through the arced portion of pipe 12 lies at an angle of about 45 degrees.

Figure 2:
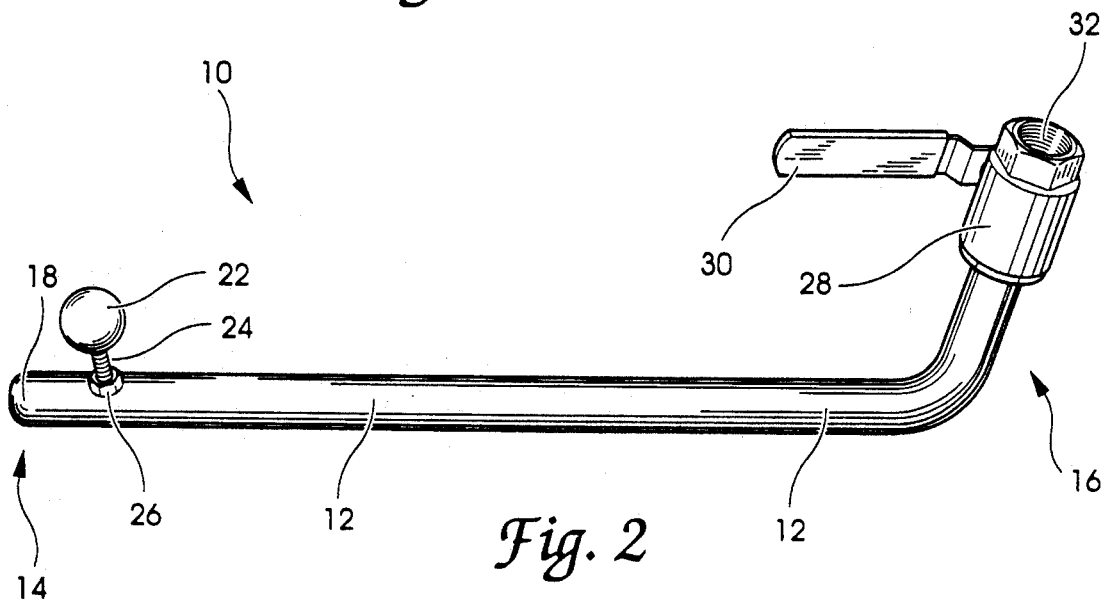
FIG. 2 is a rear view of the tubeless tire bead seater of FIG. 1.

Pipe 12 is further provided at its first end portion 14 with first handle means for providing a stabilizing hand grip at the first end portion 14 of pipe 12. Referring again to FIG. 1, in the preferred embodiment, the first handle means is a 1 and ½ inch diameter knob 22, affixed to the first end portion 14 of pipe 12 with a ⅜ inch socket head cap screw 24 and a simple lock nut 26, which together position the knob a short distance away from pipe 12 to provide finger clearance between knob 22 and pipe 12 (FIG. 2). As illustrated in the drawings, knob 22 has been affixed to pipe 12 so that a centerline drawn through the socket head cap crew 24 would generally intersect a centerline drawn through the arced portion of pipe 12 at an angle of about 90 degrees, and would intersect the plane in which a centerline drawn through the arced portion of pipe 12 lies at an angle of about 45 degrees.

At the second end portion of pipe 12 there is also provided pneumatic valve means, which in the preferred embodiment is a 1 inch full port ball valve 28 with 1 and ¼ inch female threads 32 at each end. Full port ball valve 28 is threadingly affixed by means of female threads 32 to the threads 20 of the second end portion 16 of pipe 12 (FIG. 1). The full port ball valve 28 also includes second handle means for providing a stabilizing hand grip at the second end portion 16 of pipe 12, which in the preferred embodiment is a quarter turn on/off lever 30 by which the full port ball valve is manually operated.

Figure 7:
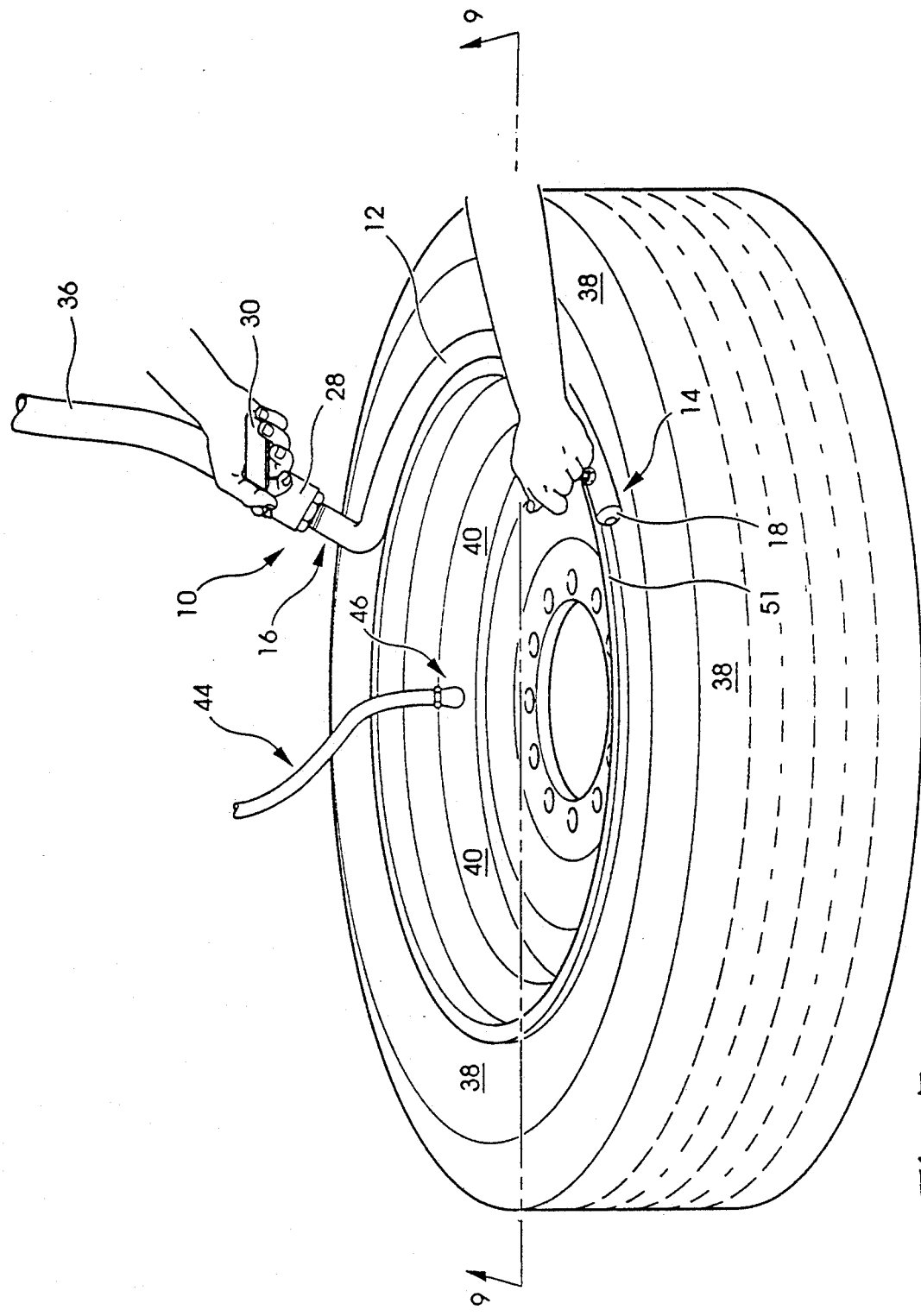
FIG. 7 is a perspective view of the tubeless tire bead seater of FIG. 1 in position to seat the bead of a 24.5 inch tubeless truck tire upon a 24.5 inch tubeless truck wheel or rim.
Figure 8:
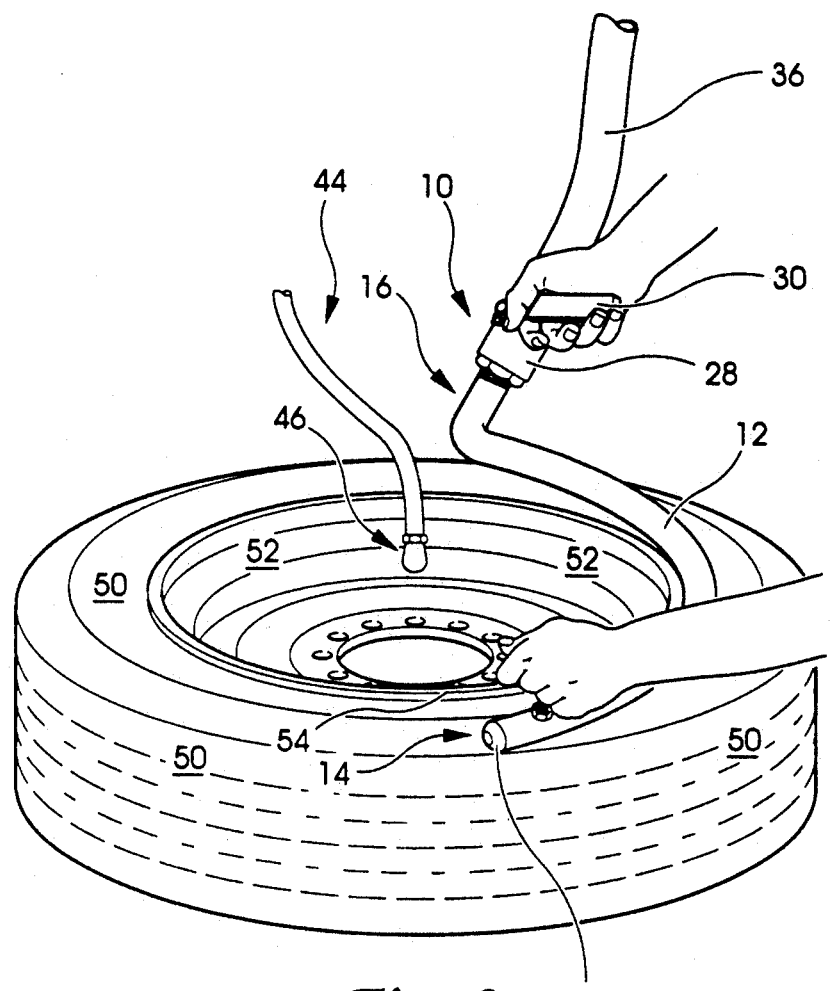
FIG. 8 is a perspective view of the tubeless tire bead seater of FIG. 1 in position to seat the bead of a 15 inch tubeless tire upon a 15 inch wheel or rim.
Figure 9:
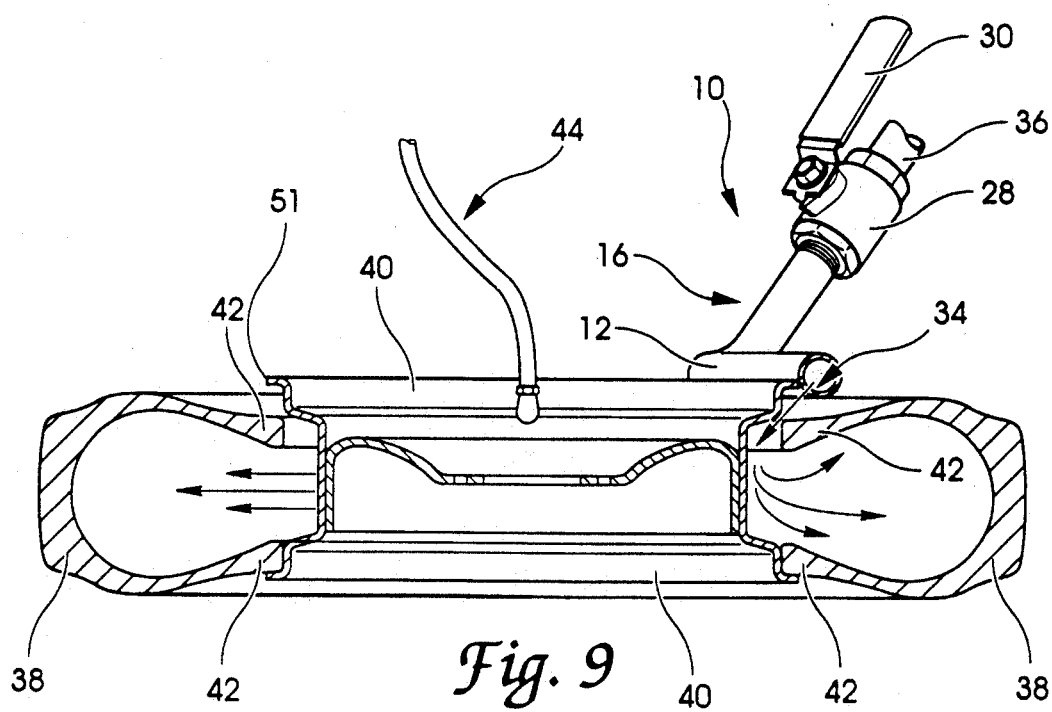
FIG. 9 is a slightly reduced cross-sectional view of the tubeless tire bead seater in the position shown in FIG. 7, taken along line 9—9, with the bead seater shown in the operating condition, but without the hand of the operator for clarity.

The arced portion of pipe 12 is further provided with pneumatic openings that are in communication with the full port ball valve 28, which in the preferred embodiment include a plurality of circular holes 34 that are positioned along the length of the arced portion of pipe 12. The holes 34 are positioned such that when the arced portion of pipe 12 is abutted against the outermost bead area of a wheel or rim that has a deflated tubeless tire mounted thereon, the plurality of holes are aligned over the gap between the bead area of the wheel or rim and the unseated tubeless tire bead (FIGS. 7, 8 and 9). Generally, this means that centerlines drawn through each of the circular holes 34 would intersect a centerline drawn through the arced portion of pipe 12 at an angle of about 90 degrees, and would intersect the plane in which a centerline drawn through the arced portion of pipe 12 would lie at an angle of about 45 degrees. In the preferred embodiment illustrated in the drawings, twelve holes 34 have been provided over the length of the arced portion of pipe 12 on about two inch centers. The length of the arced portion of pipe 12 in the preferred embodiment thus measures about 24 inches. Eleven of the twelve holes are ⅜ inch in diameter, and one is 9/16 inch in diameter to accommodate the ⅜ inch socket head cap screw 24 for mounting knob 22 (FIG. 1).

Referring now to FIGS. 7, 8 and 9, to place the tubeless tire bead seater 10 of the preferred embodiment into operation, the free female threads 32 of the full port ball valve 28 are attached to a 1 inch general purpose hose 36 that supplies compressed air at about 120 to 170 p.s.i. to full port ball valve 28. A deflated 24.5 inch tubeless tire 38 is mounted upon a 24.5 inch tubeless tire wheel 40 by conventional means, and the tire beads 42 are prepared for seating in the customary fashion. A conventional secondary source of compressed air 44 is attached to a valve stem 46 that has been premounted through the tubeless wheel 40, and compressed air is injected through the valve stem 46.

Referring now to FIGS. 7 and 8, the operator would then firmly grip the knob 22 of tubeless tire bead seater 10 with one hand and would firmly grip the on/off lever 30 of the full port ball valve 28 with the other hand, and then firmly abut the innermost arc 48 of the arced portion of pipe 12 against the outermost bead area 50 of wheel 40 (FIGS. 7 and 9). A quick quarter turn of on/off lever 30 then opens full port ball valve 28, which sends compressed air at about 120 to 170 p.s.i. from hose 36 through full port ball valve 28, into pipe 12, and out of the holes 34 into the deflated tubeless tire 38 through the gap between outermost bead area 50 and unseated tire bead 42 (FIG. 9). Instantaneously, the volume of air entering tubeless tire 38 from the holes 34 and from the valve stem 46 is greater than the air escaping through the gap between the upper unseated bead 42 and the outermost bead area 51 of wheel 40, and the tubeless tire 38 rapidly expands, seating the beads of the tubeless tire 38 onto the bead area of wheel 40. At that moment, the tubeless tire 38 in cooperation with wheel 40 form a pressurizable chamber that can be charged with air to the desired inflated air pressure for the tubeless tire 38 by means of the compressed air being injected into the tubeless tire 38 through valve stem 46.

As illustrated in FIG. 8, the tubeless tire bead seater 10 of the preferred embodiment can be utilized with smaller diameter tubeless tire 50 and wheel 52 without mechanical adjustments by physically abutting as much of the innermost arc 48 of the arced portion of pipe 12 as possible against as much of the outermost bead area 54 of the smaller tubeless wheel 52 as possible. When proceeding as above, experience to date has shown that the bead seater 10 of the preferred embodiment works satisfactorily to seat the beads of 15 inch tubeless tires onto 15 inch wheels or rims in this manner. Even with fewer of the plurality of holes 34 of the preferred embodiment directly aligned with the gap between the unseated bead of the smaller tubeless tire 50 and the smaller outermost bead area 54 of wheel 52, the tubeless tire bead seater 10 of the preferred embodiment sends a sufficient volume of compressed air into the smaller deflated tubeless tire 50 to cause tubeless tire 50 to rapidly expand, seating the beads of the tubeless tire 50 onto the bead area of smaller wheel 52 in the manner described above. Unlike the pneumatic bead seaters of the prior art, however, no adjustments to the size or configuration of the bead seater 10 of the present invention is required to accommodate small diameter tires and wheels and rims, and the operator of the bead seater 10 of the present invention maintains complete control of the device through firm grips upon knob 22 and on/off lever 30 and the resulting firm contact between a portion of the innermost arc 48 of pipe 12 and the outermost bead area 54 of the smaller wheel 52.

While the invention has been illustrated and described in detail in the drawings and foregoing description, the same is to be considered as illustrative only and not restrictive in character, it being understood that only the preferred embodiment has been shown and described and that all changes and modifications that come within the spirit of the invention are desired to be protected.

What is claimed is:

1. A pneumatic device for seating the beads of a tubeless tire onto the bead area of a tubeless wheel or rim, comprising:
    a pneumatic pipe having a first end portion and a second end portion and shaped in the form of an arc from the first end portion to the second end portion;
    first handle means attached to the first end portion of the pipe for providing a stabilizing hand grip at the first end portion of the pipe;
    pneumatic valve means attached to the second end portion of the pipe for selectively communicating the pipe with a source of compressed air, and including second handle means for providing a stabilizing hand grip at the second end portion of the pipe; and
    pneumatic openings in the arc-shaped portion of the pipe communicating with the valve means and positioned to direct compressed air into the gap between an unseated tubeless tire bead and the bead area of the wheel or rim upon which the bead is to be seated.

2. A pneumatic tool for seating the beads of a tubeless tire onto the bead area of a tubeless wheel or rim, comprising:
    a pneumatic pipe having a first end portion and a second end portion and shaped in the form of an arc from the first end portion to the second end portion;
    first handle means attached to the first end portion of the pipe for providing a stabilizing hand grip at the first end portion of the pipe;
    pneumatic valve means attached to the second end portion of the pipe for selectively communicating the pipe with a source of compressed air, and including a full port ball valve with second handle means for providing a stabilizing hand grip at the second end portion of the pipe; and
    pneumatic openings spaced along the arc-shaped portion of the pipe and communicating with the valve means and positioned to direct compressed air into the gap between an unseated tubeless tire bead and the bead area of the wheel or rim upon which the bead is to be seated.

3. A pneumatic tool for seating the beads of a tubeless tire onto the bead area of a tubeless wheel or rim, comprising:
    a pneumatic pipe having a first end portion and a second end portion and shaped in the form of a planar arc from the first end portion to, but not including, the second end portion;

first handle means attached to the first end portion of the pipe for providing a stabilizing hand grip at the first end portion of the pipe;

pneumatic valve means attached to the second end portion of the pipe for selectively communicating the pipe with a source of compressed air, and including a full port ball valve with second handle means for providing a stabilizing hand grip at the second end portion of the pipe, the second handle means including an on/off lever by which the full port ball valve is manually operated; and a plurality of pneumatic holes spaced along the arc-shaped portion of the pipe that communicate with the valve means and that are positioned to direct compressed air into the gap between an unseated tubeless tire bead and the bead area of the wheel or rim upon which the bead is to be seated when the valve means communicates compressed air to the pneumatic holes.

4. The pneumatic tool of claim 3 wherein the arced portion of the pneumatic pipe has about 90 degrees of arc.

5. The pneumatic tool of claim 3 wherein the first and second handle means are disposed about the first and second ends of the pneumatic pipe approximately inline with the direction of air flow through the pneumatic holes closest to their points of attachment to the pneumatic pipe.

6. The pneumatic tool of claim 3 wherein the pneumatic pipe is a one inch inner diameter pipe measuring about twenty-four inches from the first end portion to, but not including, the second end portion.

7. The pneumatic tool of claim 6 wherein the pneumatic valve means includes a one inch full port ball valve with second handle means for providing a stabilizing hand grip at the second end portion of the pipe, the second handle means including a quarter turn on/off lever by which the full port ball valve is manually operated.

8. The pneumatic tool of claim 6 wherein the plurality of pneumatic holes include about twelve circular holes of about $\frac{3}{8}$ inch diameter on about two inch centers.

* * * * *